(12) United States Patent
Zhang et al.

(10) Patent No.: US 12,097,737 B2
(45) Date of Patent: Sep. 24, 2024

(54) LEVELING CONTROL METHOD FOR MULTI-POINT SUPPORT PLATFORM

(71) Applicant: Shandong University of Technology, Zibo (CN)

(72) Inventors: Fan Zhang, Zibo (CN); Wentao Yang, Zibo (CN); Xianyue Gang, Zibo (CN); Huiheng Wang, Zibo (CN); Jixing Wu, Zibo (CN); Aibing Liu, Zibo (CN); Chunyi Lv, Zibo (CN)

( * ) Notice: Subject to any disclaimer, the term of this patent is extended or adjusted under 35 U.S.C. 154(b) by 781 days.

(21) Appl. No.: 17/208,034

(22) Filed: Mar. 22, 2021

(65) Prior Publication Data

US 2022/0227195 A1    Jul. 21, 2022

(51) Int. Cl.
  *G05B 19/404*    (2006.01)
  *B60G 17/016*    (2006.01)
  *B60G 17/018*    (2006.01)

(52) U.S. Cl.
  CPC ......... *B60G 17/018* (2013.01); *B60G 17/016* (2013.01); *G05B 19/404* (2013.01); *B60G 2400/051* (2013.01); *B60G 2400/61* (2013.01)

(58) Field of Classification Search
  CPC .................................................. G05B 19/404
  USPC ......................................................... 700/62
  See application file for complete search history.

(56) References Cited

FOREIGN PATENT DOCUMENTS

| CN | 101847448 A | * | 9/2010 | |
|---|---|---|---|---|
| CN | 103292130 A | * | 9/2013 | |
| CN | 104076828 A | * | 10/2014 | |
| CN | 108004782 A | | 12/2014 | |
| CN | 104571145 A | * | 4/2015 | |
| CN | 111169664 A | * | 5/2020 | |
| WO | WO-2014187237 A1 | * | 11/2014 | ............. F16F 15/00 |

* cited by examiner

*Primary Examiner* — Hien D Khuu
(74) *Attorney, Agent, or Firm* — Lei Jiang

(57) ABSTRACT

The present disclosure discloses a leveling control method for a multi-point support platform, which comprises the steps: respectively measuring and obtaining a load-bearing interaction matrix and a deformation interaction matrix of the platform to construct a load-bearing and deformation joint control matrix; calculating the optimal loads of the legs and measuring the current loads of the legs to obtain the load deviation rates of the legs, and determining if the platform warrants leveling in combination with the two-dimensional inclination angles of the platform; constructing a platform geometry and leg load joint control equation according to the two-dimensional inclination angles of the platform, the load deviations of the legs and the load-bearing and deformation joint control matrix, calculating the actuation quantities of the legs and performing synchronous leveling; and determining the load deviation rates of the legs and the two-dimensional inclination angles of the platform cyclically and performing the actuation control until the leveling goal is achieved. The method is capable of synchronously realizing the geometric leveling of the platform and the load control of the legs, and can significantly improve the speed, geometric accuracy, process stability, leg load-bearing stability and control robustness of the leveling control for the multi-point support platform.

2 Claims, 2 Drawing Sheets

LEVELING CONTROL METHOD FOR MULTI-POINT SUPPORT PLATFORM

CROSS-REFERENCE TO RELATED APPLICATIONS

The subject application claims priority of the Chinese invention application 2021100751602 filed on Jan. 20, 2021 in China. The contents and subject matter thereof are incorporated herein by reference.

FIELD OF INVENTION

The present disclosure relates to the field of attitude control and specifically relates to a leveling control method for a multi-point support platform.

BACKGROUND ART

Leveling control of the multi-point support platform is technical mainstay, or is traceable as such, in many fields, such as attitude control of multi-axle hydro-pneumatic vehicles, multi-leg leveling of special military and civilian vehicles, precision assembly of large aircraft components, support control of large optical lenses, bearing, installation and debugging of the foundation of machines, etc.; thus it is prerequisite in said fields. Traditional leveling control methods have no strict control theory model, realize the leveling function based on the point chasing method and angle error method via iterative testing and actuation. Such methods are defective with low speed, low accuracy, repeated oscillation, incomplete control of leg load, and even weak leg and overloading. In recent years, quite a few PLC, PID control, neural network control, etc., are applied to the automatic leveling system, but the control system is complicated, not easily adaptable, while the afore-mentioned defectives of low speed, low accuracy and incomplete control of leg load remain not effectively resolved.

For example, the Chinese patent CN201010169552.7 discloses an automatic leveling device and method, in which an angle and displacement calculation unit is employed to detect the horizontal deviation degree of a loading platform and to generate electrical signals; the electrical signals are then processed into driving control signals for iterative adjustment. The Chinese patent CN201410800478.2 discloses a leveling method and device for a support platform, which are employed for a long-span four-point support platform. The method is to respectively install bi-axial leveling sensors at the front and rear launching platform, and respectively adjust the transverse and longitudinal angles of the front and rear platform according to set rules to meet set thresholds. The Chinese patent CN202010002450.X discloses a leveling control system and method. The method is to firstly adjust the leg height to make the first inclination angle meet the accuracy requirement, and then make the second inclination angle meet the accuracy requirement; repeat the whole process until both first and second inclination angles are less than the ultimate inclination angle, until completion of leveling. The afore-mentioned patents all realize the leveling function through iterative testing and actuation, but are incapable of guaranteeing the leveling accuracy and speed or of achieving complete control over the leg loads.

The leveling control of a multi-point support platform with more than three legs is a typical statically indeterminate problem. The elastic deformation and supporting loads of the legs and the platform affect each other in actual load bearing. The actuation quantities of the legs determined by rigid leveling method of prior art neither can achieve accurate leveling, nor can achieve complete control over the leg loads. To solve the problem, joint control of the platform geometry and leg load is a must. Therefore, the present patent discloses a high speed and synchronous implementation of a joint leveling control method for both platform geometry and leg load, in which accurate actuation quantities of the legs can be obtained, and the leveling objective is achieved within few iterations.

SUMMARY OF THE INVENTION

In view of the afore-mentioned problem, the present disclosure provides a leveling control method for a multi-point support platform, by taking into full consideration of leg deformation, platform deformation, and the load-bearing interaction between the legs and the platform, to construct a joint control method for simultaneous realization of platform geometry leveling and leg load distribution, thus solving the problems of prior art leveling method in low precision, low speed, poor robustness, incomplete control of legs, even weak leg and overloading.

Embodiments of the present disclosure disclose a leveling control method for a multi-point support platform. Wherein, each leg of the platform has an equivalent length of maximum stroke. The leveling control method for the multi-point support platform comprises the following steps:

Step 1, assigning serial numbers 1-n respectively to n legs; driving the i-th leg to generate a set displacement vertical thereto respectively for each i, with the n legs other than the i-th leg remaining fixed, wherein the range of i is 1-n; measuring and calculating the load increment of each leg in ascending order from 1 to n, and inputting the load increments into the i-th row of an n×n dimensional matrix from column one to column n; and deleting three rows of data corresponding to any three legs that are not located on a straight line from the n×n dimensional matrix to construct a (n−3)×n dimensional load-bearing interaction matrix $$[K_f]_{(n-3)\times n} = \begin{bmatrix} f_{11} & f_{12} & \cdots & f_{1n} \\ f_{21} & f_{22} & \cdots & f_{2n} \\ \vdots & \vdots & \vdots & \vdots \\ f_{n1} & f_{n2} & \cdots & f_{nn} \end{bmatrix}_{(n-3)\times n}.$$

Step 2, measuring inclination angle variations $\theta_{ix}$ and $\theta_{iy}$ of the platform around the longitudinal and transverse directions in synchronization with the driving the i-th leg to generate the set displacement vertical thereto of step 1, and inputting $\theta_{ix}$ and $\theta_{iy}$ into the first and second rows of the i-th column of a 2×n dimensional matrix respectively to construct a 2×n dimensional deformation interaction matrix $$[\theta]_{2\times n} = \begin{bmatrix} \theta_{1x} & \theta_{2x} & \cdots & \theta_{nx} \\ \theta_{1y} & \theta_{2y} & \cdots & \theta_{ny} \end{bmatrix}_{2\times n}.$$

Step 3, sequentially inputting the load-bearing interaction matrix into first (n−3) rows of an (n−1)×n dimensional matrix, and sequentially inputting the deformation interaction matrix into last two rows of the (n−1)×n dimensional matrix to construct a load-bearing and deformation joint control matrix $$\begin{bmatrix} K_f \\ \theta \end{bmatrix}_{(n-1)\times n} = \begin{bmatrix} f_{11} & f_{12} & \cdots & f_{1n} \\ f_{21} & f_{22} & \cdots & f_{2n} \\ \vdots & \vdots & & \vdots \\ f_{n1} & f_{n2} & \cdots & f_{nn} \\ \theta_{1x} & \theta_{2x} & \cdots & \theta_{nx} \\ \theta_{1y} & \theta_{2y} & \cdots & \theta_{ny} \end{bmatrix}_{(n-1)\times n}.$$

Step 4, establishing a coordinate system by taking the mass center of the platform as the origin of the coordinate system and the longitudinal, transverse and vertical directions of the platform as x, y and z axes respectively, wherein coordinates of the connection points between the legs and the platform are denoted as $(x_i, y_i, z_i)$, the total weight of the platform is denoted as G, and the ideal load quotas of the legs are set as $F_i^s$ respectively, and by taking the minimum mean square error of the loads of the legs $F_i$ and ideal load quotas of the legs as the goal and torque balance of the platform along the x axis, torque balance of the platform along the y axis and force balance along the z axis as constraints, the optimal load calculation model of the legs is $$\begin{cases} \min \dfrac{1}{2} \sum_{i=1}^{n} (F_i - F_i^s)^2 \\ \text{s.t.} \\ \sum_{i=1}^{n} F_i - G = 0 \\ \sum_{i=1}^{n} F_i x_i = 0 \\ \sum_{i=1}^{n} F_i y_i = 0 \end{cases}.$$

The above expression is solved by means of the Lagrange Multiplier Method, and the optimal loads of all the legs $F_i^*$ satisfy $$\begin{Bmatrix} F_1^* \\ F_2^* \\ \vdots \\ F_n^* \\ a \\ b \\ c \end{Bmatrix}_{(n+3)\times 1} = \begin{bmatrix} 1 & 0 & \cdots & 0 & 1 & x_1 & y_1 \\ 0 & 1 & \cdots & 0 & 1 & x_2 & y_2 \\ \vdots & \vdots & \vdots & \vdots & \vdots & \vdots & \vdots \\ 0 & 0 & \cdots & 1 & 1 & x_n & y_n \\ 1 & 1 & \cdots & 1 & 0 & 0 & 0 \\ x_1 & x_2 & \cdots & x_n & 0 & 0 & 0 \\ y_1 & y_2 & \cdots & y_n & 0 & 0 & 0 \end{bmatrix}^{-1}_{(n+3)\times(n+3)} \begin{Bmatrix} F_1^s \\ F_2^s \\ \vdots \\ F_n^s \\ G \\ 0 \\ 0 \end{Bmatrix}_{(n+3)\times 1}.$$

In the above expression, a, b and c are intermediate calculation quantities.

Step 5, measuring the current loads of the legs $F_i^t$, and calculating the load deviation rates between the current loads of the legs and the optimal loads of the legs $F_i^*$:

$$F_i^d = \left| \frac{F_i^t - F_i^*}{F_i^*} \right|;$$

measuring the inclination angles of the platform around the x and y axes: $\Delta\theta_x$, $\Delta\theta_y$.

Step 6, comparing the load deviation rates of the legs and the two-dimensional inclination angles of the platform with the set load deviation rate threshold and inclination angle threshold respectively to determine if the leg locking condition is satisfied: on condition the load deviation rates of all the legs are smaller than or equal to the load deviation rate threshold $F_i^d \leq \varepsilon_F$, and all the two-dimensional inclination angles of the platform are smaller than or equal to inclination angle threshold $\Delta\theta_x \leq \varepsilon_\theta$ and $\Delta\theta_y \leq \varepsilon_\theta$, concluding the leveling control method; otherwise proceeding to step 7.

Step 7, substituting the optimal loads of the legs described in step 4, the current loads of the legs described in step 5, the two-dimensional inclination angles of the platform described in step 5 and the load-bearing and deformation joint control matrix described in step 3 into the following expression to construct a platform geometry and leg load joint control equation $$\begin{bmatrix} K_f \\ \theta \end{bmatrix}_{(n-1)\times n} \{\Delta x_i\}_{n\times 1} = \begin{Bmatrix} F_i^t - F_i^* \\ \theta_m^t \end{Bmatrix}_{(n-1)\times 1}$$

in the above expression, $F_i^t$ is the current load, $F_i^*$ is the optimal load, $\{F_i^t - F_i^*\}$ is a (n−3)×1 dimensional column vector obtained corresponding to deletion of data of the three legs described in step 1.

$$\theta_m^t = \begin{Bmatrix} \Delta\theta_x \\ \Delta\theta_y \end{Bmatrix}$$

are the inclination angles of the platform around the x and y axes, and by solving the above expression with the Generalized Inverse Method, obtaining actuation quantities $\Delta x_i$ of the legs for the geometric leveling and load control of the platform.

Step 8, dividing the calculated actuation quantities $\Delta x_i$ of the legs by the maximum value of the actuation quantities to obtain the proportional relationship between the actuation quantities of the legs, and controlling the legs to synchronously actuate for leveling according to the proportional relationship, until achieving the actuation quantities of the legs.

Step 9, measuring the current loads of the legs $F_i^t$, and calculating the load deviation rates between the current loads of the legs and optimal loads of the legs $F_i^*$:

$$F_i^d = \left| \frac{F_i^t - F_i^*}{F_i^*} \right|;$$

and measuring the inclination angles of the platform around the x and y axes: $\Delta\theta_x$, $\Delta\theta_y$.

Step 10, comparing the load deviation rates of the legs and the two-dimensional inclination angles of the platform with the set load deviation rate threshold and inclination angle threshold respectively to determine if the leg locking condition is satisfied: on condition the load deviation rates of all the legs are smaller than or equal to the load deviation rate threshold $F_i^d \leq \varepsilon_F$, and all the two-dimensional inclination angles of the platform are smaller than or equal to inclination angle threshold $\Delta\theta_x \leq \varepsilon_\theta$ and $\Delta\theta_y \leq \varepsilon_\theta$, concluding the leveling control method, otherwise proceeding to step 11;

Step 11, re-substituting the current loads of the legs and the two-dimensional inclination angles of the platform described in step 9 into the platform geometry and leg load joint control equation described in step 7, calculating the actuation quantities of the legs and executing steps 8 and 9 until the leg locking condition is satisfied, and concluding the leveling control method.

Preferably, the set displacement described in step 1 is in the range of 1% to 5% of the maximum stroke.

The present disclosure discloses a leveling control method for a multi-point support platform by means of a platform geometry and leg load joint control scheme. Compared with the prior art:

The leveling control method disclosed by the present disclosure, based on high precision geometric leveling, achieves load distribution of the legs close to the ideal load quotas of the legs, thus fundamentally solving the problems in prior art with incomplete control of leg loads, even weak leg and overloading, thus achieving post-leveling high attitude stability for the platform;

The actuation quantities of the legs required for leveling in the present disclosure are obtained with consideration of the deformation of the legs and platform, as well as the load-bearing interaction characteristics, the leveling effect is achieved with only a few iterations, and thus the method of the present disclosure has high speed, high accuracy, small oscillation, and the high robustness.

EMBODIMENTS

For clearer understanding of the object, the technical solution and the advantages of the present disclosure, the present disclosure is further described in detail in combination with the attached drawings and embodiments hereunder. It is understood that the specific embodiments described herein are meant only to explain, not to limit, the present disclosure.

Figure 1:
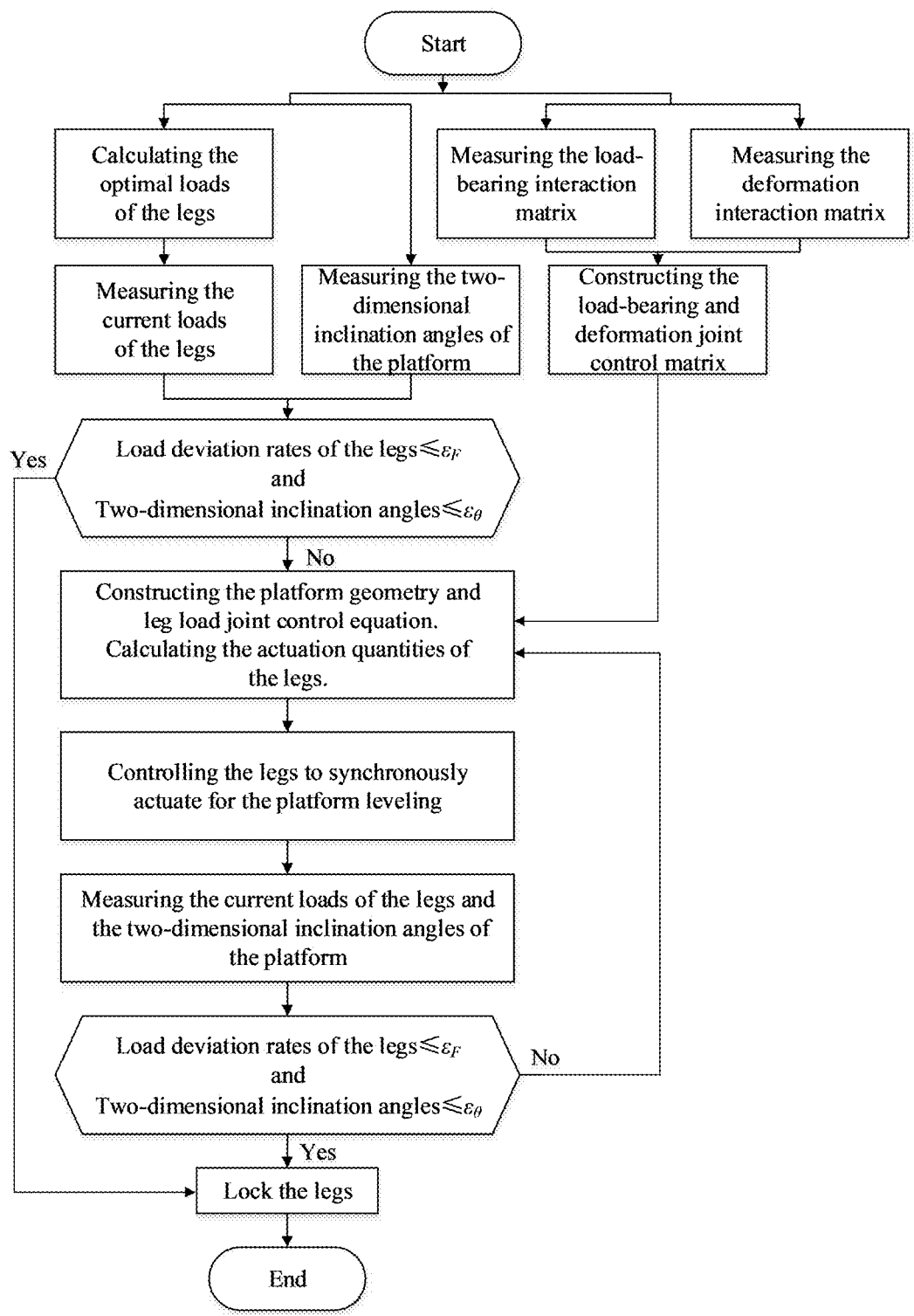
FIG. 1 is a flow chart of the leveling control method for the multi-point support platform of the present disclosure.

FIG. 1 is a flow chart of the leveling control method for the multi-point support platform provided by an embodiment of the present disclosure.

Figure 2:
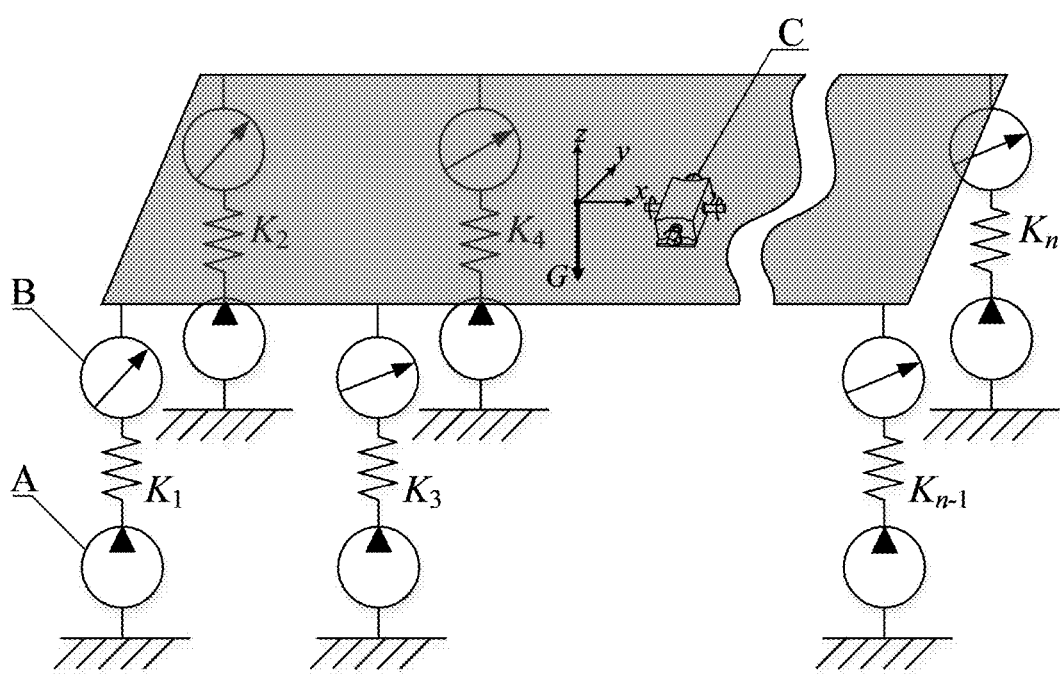
FIG. 2 is a simplified schematic diagram of the structure of the multi-point support platform of the present disclosure.

FIG. 2 is a simplified schematic diagram of the structure of the multi-point support platform provided by an embodiment of the present disclosure. The model comprises n legs $K_1, K_2, \ldots K_{n-1}, K_n$, n leg drivers A, n force sensors B and one two-dimensional inclination angle sensor C.

The leveling control method for the multi-point support platform of the present disclosure corrects the defects of prior art leveling process in low precision, low speed, the poor robustness, incomplete control of the load of legs, even weak leg and overloading. In the multi-point support platform, each leg of the platform has an equivalent length of maximum stroke. The leveling control method for the multi-point support platform comprises the following steps:

Step 1, assigning serial numbers 1-n respectively to n legs; a leg driver A driving the first leg $K_1$ to produce a set displacement vertical thereto, i.e. in the z-axis direction while keeping the lower ends of the other n−1 legs fixed, denoting load increments of the first to n-th legs measured by the force sensors B as load-bearing interaction coefficients $f_{11}, f_{12}, \ldots f_{1n}$, and then inputting $f_{11}, f_{12}, \ldots f_{1n}$ into the first row of a n×n dimensional matrix sequentially; sequentially operating the second to n-th legs in the same way to construct the n×n dimensional matrix; and because the platform has three rigid degrees of freedom, that is translation along z-axis, rotations around x-axis and y-axis, the n×n dimensional matrix is a singular matrix of rank three, thus need deleting three rows of data corresponding to any three legs that are not located on a straight line from the n×n dimensional matrix to construct a (n−3)×n dimensional load-bearing interaction matrix $$[K_f]_{(n-3)\times n} = \begin{bmatrix} f_{11} & f_{12} & \cdots & f_{1n} \\ f_{21} & f_{22} & \cdots & f_{2n} \\ \vdots & \vdots & \vdots & \vdots \\ f_{n1} & f_{n2} & \cdots & f_{nn} \end{bmatrix}_{(n-3)\times n}.$$

Step 2, the two-dimensional inclination angle sensor C measuring and obtaining inclination angle variations $\theta_{1x}$ and $\theta_{1y}$ of the platform around the x and y axes in synchronization with the driving the first leg $K_1$ to produce a set displacement vertical thereto of step 1, and inputting $\theta_{1x}$ and $\theta_{1y}$ into the first and second rows of the first column of a 2×n dimensional matrix respectively; measuring and obtaining two-dimensional inclination angle variations of the platform in the same way with the second to n-th legs to produce a set displacement vertical thereto of step 1 to construct a 2×n dimensional deformation interaction matrix $$[\theta]_{2\times n} = \begin{bmatrix} \theta_{1x} & \theta_{2x} & \cdots & \theta_{nx} \\ \theta_{1y} & \theta_{2y} & \cdots & \theta_{ny} \end{bmatrix}_{2\times n}.$$

Step 3, sequentially inputting the load-bearing interaction matrix into first (n−3) rows of an (n−1)×n dimensional matrix, and sequentially inputting the deformation interaction matrix into last two rows of the (n−1)×n dimensional matrix to construct a load-bearing and deformation joint control matrix $$\begin{bmatrix} K_f \\ \theta \end{bmatrix}_{(n-1)\times n} = \begin{bmatrix} f_{11} & f_{12} & \cdots & f_{1n} \\ f_{21} & f_{22} & \cdots & f_{2n} \\ \vdots & \vdots & \vdots & \vdots \\ f_{n1} & f_{n2} & \cdots & f_{nn} \\ \theta_{1x} & \theta_{2x} & \cdots & \theta_{nx} \\ \theta_{1y} & \theta_{2y} & \cdots & \theta_{ny} \end{bmatrix}_{(n-1)\times n}.$$

Step 4, establishing a coordinate system by taking the mass center of the platform as the origin of the coordinate system and the longitudinal, transverse and vertical directions of the platform as x, y and z axes respectively, wherein coordinates of the connection points between the legs and the platform are denoted as $(x_i, y_i, z_i)$, the total weight of the platform is denoted as G, the ideal load quotas of the legs are set as $F_i^s$ respectively, and by taking the minimum mean square error of the loads of the legs $F_i$ and the ideal load quotas of the legs as the goal and torque balance of the platform along the x axis, torque balance of the platform along the y axis and force balance along the z axis as constraints, the optimal load calculation model of the legs satisfies $$\begin{cases} \min \frac{1}{2}\sum_{i=1}^{n}(F_i - F_i^s)^2 \\ \text{s.t.} \\ \sum_{i=1}^{n}F_i - G = 0 \\ \sum_{i=1}^{n}F_i x_i = 0 \\ \sum_{i=1}^{n}F_i y_i = 0 \end{cases}.$$

The optimal load calculation model is solved by the Lagrange Multiplier Method, and the optimal loads of all the legs $F_i^*$ satisfy $$\begin{Bmatrix} F_1^* \\ F_2^* \\ \vdots \\ F_n^* \\ a \\ b \\ c \end{Bmatrix}_{(n+3)\times 1} = \begin{bmatrix} 1 & 0 & \cdots & 0 & 1 & x_1 & y_1 \\ 0 & 1 & \cdots & 0 & 1 & x_2 & y_2 \\ \vdots & \vdots & \vdots & \vdots & \vdots & \vdots & \vdots \\ 0 & 0 & \cdots & 1 & 1 & x_n & y_n \\ 1 & 1 & \cdots & 1 & 0 & 0 & 0 \\ x_1 & x_2 & \cdots & x_n & 0 & 0 & 0 \\ y_1 & y_2 & \cdots & y_n & 0 & 0 & 0 \end{bmatrix}^{-1}_{(n+3)\times(n+3)} \begin{Bmatrix} F_1^s \\ F_2^s \\ \vdots \\ F_n^s \\ G \\ 0 \\ 0 \end{Bmatrix}_{(n+3)\times 1}$$

wherein a, b and c are intermediate calculation quantities.

Step 5, the force sensors B measuring the current loads $F_i^t$ actually borne by the legs, and calculating the load deviation rates of the legs according to the current loads $F_i^t$ of the legs and corresponding optimal loads $F_i^*$:

$$F_i^d = \left| \frac{F_i^t - F_i^*}{F_i^*} \right|;$$

and the two-dimensional inclination angle sensor C measuring the inclination angles of the platform around the x and y axes: $\Delta\theta_x$, $\Delta\theta_y$.

Step 6, comparing the load deviation rates of the legs and the two-dimensional inclination angles of the platform with the set load deviation rate threshold and inclination angle threshold respectively to determine if the leg locking condition is satisfied: on condition the load deviation rates of all the legs are smaller than or equal to the load deviation rate threshold $F_i^d \le \varepsilon_F$, and all the two-dimensional inclination angles of the platform are smaller than or equal to inclination angle threshold $\Delta\theta_x \le \varepsilon_\theta$ and $\Delta\theta_y \le \varepsilon_\theta$, concluding the leveling control method, otherwise proceeding to step 7.

Step 7, substituting the current loads of the legs, the optimal loads of the legs, the two-dimensional inclination angles of the platform and the load-bearing and deformation joint control matrix into the following expression to construct a platform geometry and leg load joint control equation $$\begin{bmatrix} K_f \\ \theta \end{bmatrix}_{(n-1)\times n} \{\Delta x_i\}_{n\times 1} = \begin{Bmatrix} F_i^t - F_i^* \\ \theta_m^t \end{Bmatrix}_{(n-1)\times 1}$$

in the above expression, $F_i^t$ is the current load, $F_i^*$ is the optimal load, $\{F_i^t - F_i^*\}$ is a (n−3)×1 dimensional column vector obtained after the data of the three legs described in step 1 are deleted, and $$\theta_m^t = \begin{Bmatrix} \Delta\theta_x \\ \Delta\theta_y \end{Bmatrix}$$

are the inclination angles of the platform around the x and y axes, and by solving this expression with the Generalized Inverse Method, the actuation quantities $\Delta x_i$ of the legs that are needed for the realization of the geometric leveling of the platform and load control of the legs are obtained.

Step 8, dividing the calculated actuation quantities $\Delta x_i$, of the legs by the maximum value of the actuation quantities respectively to obtain the proportional relationship between the actuation quantities of the legs, and controlling the leg drivers A to drive the legs to actuate according to the proportional relationship, until achieving the actuation quantities of the legs.

Step 9, the force sensors B measuring the current loads actually borne by the legs, and the two-dimensional inclination angle sensor C measuring the inclination angles of the platform around the x and y axes $\Delta\theta_x$, $\Delta\theta_y$.

Step 10, comparing the load deviation rates of the legs and the two-dimensional inclination angles of the platform with the set load deviation rate threshold and inclination angle threshold respectively to determine if the leg locking condition is satisfied: on condition the load deviation rates of all the legs are smaller than or equal to the load deviation rate threshold $F_i^d \le \varepsilon_F$, and all the two-dimensional inclination angles of the platform are smaller than or equal to inclination angle threshold $\Delta\theta_x \le \varepsilon_\theta$ and $\Delta\theta_y \le \varepsilon_\theta$, concluding the leveling control method, otherwise proceeding to step 11;

Step 11, re-substituting the current loads of the legs and the two-dimensional inclination angles of the platform described in step 9 into the platform geometry and leg load joint control equation described in step 7 and calculating the actuation quantities of the legs and executing steps 8 and 9 until the locking condition is satisfied, then concluding the leveling control method.

Preferably, the set displacement described in step 1 is in the range of 1% to 5% of the maximum stroke.

Finally, it should be noted that the above descriptions are only preferred embodiments of the present disclosure with explanation of the relevant technical principles. Persons skilled in the art understand that the present disclosure is not limited to the particular embodiments described herein and that it is possible for persons skilled in the art to undertake any appreciable variation, readjustment or replacement without departing from the scope of protection of the present disclosure. Therefore, although the present disclosure is described in more detail through the above embodiments, the present disclosure is not limited to the above embodiments, but may include many other equivalent embodiments without departing from the conception of the present disclosure, which shall fall within the scope of the present disclosure as is described in the appended claims.

The invention claimed is:

1. A leveling control method for a multi-point support platform, with each leg of the platform having an equivalent length of maximum stroke, comprising the following steps:
step 1, assigning serial numbers 1-n respectively to n legs;
driving an i-th leg to generate a set displacement vertical thereto for each i, with the n legs other than the i-th leg remaining fixed, and i ranging from 1-n;

measuring and calculating a load increment of each leg in ascending order from 1 to n, and sequentially inputting the load increments into an i-th row of an n×n dimensional matrix from column one to column n; and deleting three rows of data corresponding to any three legs not located on a straight line from the n×n dimensional matrix to construct a (n−3)×n dimensional load-bearing interaction matrix $$[K_f]_{(n-3)\times n} = \begin{bmatrix} f_{11} & f_{12} & \cdots & f_{1n} \\ f_{21} & f_{22} & \cdots & f_{2n} \\ \vdots & \vdots & \vdots & \vdots \\ f_{n1} & f_{n2} & \cdots & f_{nn} \end{bmatrix}_{(n-3)\times n} ; \quad (1)$$

step 2, measuring inclination angle variations $\theta_{ix}$ and $\theta_{iy}$ of the platform around longitudinal and transverse directions in synchronization with the driving each i-th leg to generate the set displacement vertical thereto of step 1, and inputting $\theta_{ix}$ and $\theta_{iy}$ into a first and a second row of an i-th column of a 2×n dimensional matrix respectively to construct a 2×n dimensional deformation interaction matrix $$[\theta]_{2\times n} = \begin{bmatrix} \theta_{1x} & \theta_{2x} & \cdots & \theta_{nx} \\ \theta_{1y} & \theta_{2y} & \cdots & \theta_{ny} \end{bmatrix}_{2\times n} ; \quad (2)$$

step 3, sequentially inputting the load-bearing interaction matrix into first (n−3) rows of an (n−1)×n dimensional matrix, and sequentially inputting the deformation interaction matrix into last two rows of the (n−1)×n dimensional matrix to construct a load-bearing and deformation joint control matrix $$\begin{bmatrix} K_f \\ \theta \end{bmatrix}_{(n-1)\times n} = \begin{bmatrix} f_{11} & f_{12} & \cdots & f_{1n} \\ f_{21} & f_{22} & \cdots & f_{2n} \\ \vdots & \vdots & \vdots & \vdots \\ f_{n1} & f_{n2} & \cdots & f_{nn} \\ \theta_{1x} & \theta_{2x} & \cdots & \theta_{nx} \\ \theta_{1y} & \theta_{2y} & \cdots & \theta_{ny} \end{bmatrix}_{(n-1)\times n} ; \quad (3)$$

step 4, establishing a coordinate system by taking mass center of the platform as an origin of the coordinate system and longitudinal, transverse and vertical directions of the platform as an x, a y and a z axis respectively; denoting a coordinate of each connection point between the each leg and the platform as ($x_i$, $y_i$, $z_i$), total weight of the platform as G, and ideal load quota of the each leg as $F_i^s$ respectively for each i, and by taking minimum mean square error of loads of all legs $F_i$ with the ideal load quotas of all the legs as a goal and torque balance of the platform along the x axis, torque balance of the platform along the y axis and force balance along the z axis as constraints, obtaining optimal load model of the legs as expression (4)

$$\begin{cases} \min \dfrac{1}{2}\sum_{i=1}^{n}(F_i - F_i^s)^2 \\ \text{s.t.} \\ \sum_{i=1}^{n} F_i - G = 0 \\ \sum_{i=1}^{n} F_i x_i = 0 \\ \sum_{i=1}^{n} F_i y_i = 0 \end{cases} ; \quad (4)$$

solving expression (4) by means of the Lagrange Multiplier Method to obtain optimal loads of all the legs $F_i^*$ satisfying expression (5)

$$\begin{Bmatrix} F_1^* \\ F_2^* \\ \vdots \\ F_n^* \\ a \\ b \\ c \end{Bmatrix}_{(n+3)\times 1} = \begin{bmatrix} 1 & 0 & \cdots & 0 & 1 & x_1 & y_1 \\ 0 & 1 & \cdots & 0 & 1 & x_2 & y_2 \\ \vdots & \vdots & \vdots & \vdots & \vdots & \vdots & \vdots \\ 0 & 0 & \cdots & 1 & 1 & x_n & y_n \\ 1 & 1 & \cdots & 1 & 0 & 0 & 0 \\ x_1 & x_2 & \cdots & x_n & 0 & 0 & 0 \\ y_1 & y_2 & \cdots & y_n & 0 & 0 & 0 \end{bmatrix}_{(n+3)\times(n+3)}^{-1} \begin{Bmatrix} F_1^s \\ F_2^s \\ \vdots \\ F_n^s \\ G \\ 0 \\ 0 \end{Bmatrix}_{(n+3)\times 1} ; \quad (5)$$

step 5, measuring a current load of the each leg, and calculating a load deviation rate between the each current load with the each optimal load of the each leg; and measuring each two-dimensional inclination angle of the platform around the x and y axes;

step 6, comparing the load deviation rates of the legs and the two-dimensional inclination angles of the platform with the set load deviation rate threshold and inclination angle threshold respectively to determine if the leg locking conditions is satisfied: on condition the load deviation rates of all the legs and all the two-dimensional inclination angles of the platform are smaller than or equal to the load deviation rate threshold and inclination angle threshold respectively, proceeding to concluding the leveling control method, otherwise proceeding to step 7;

step 7, substituting the optimal loads of the legs described in step 4, the current loads of the legs described in step 5, the two-dimensional inclination angles of the platform described in step 5 and the load-bearing and deformation joint control matrix described in step 3 into expression (6) to construct a platform geometry and leg load joint control equation $$\begin{bmatrix} K_f \\ \theta \end{bmatrix}_{(n-1)\times n} \{\Delta x_i\}_{n\times 1} = \begin{Bmatrix} F_i^t - F_i^* \\ \theta_m^t \end{Bmatrix}_{(n-1)\times 1} ; \quad (6)$$

wherein $F_i^t$ being the current load, $F_i^*$ being the optimal load, $\{F_i^t - F_i^*\}$ being a (n−3)×1 dimensional column vector obtained corresponding to deletion of data of the three legs described in step 1, $$\theta_m^t = \begin{Bmatrix} \Delta \theta_x \\ \Delta \theta_y \end{Bmatrix}$$

being the inclination angles of the platform around the x and y axes; by solving expression (6) with the Generalized Inverse Method, obtaining actuation quantities $\Delta x_i$ of the legs for the geometric leveling and load control of the platform;

step 8, controlling the legs to synchronously actuate for leveling in proportion to the actuation quantities of the legs obtained in step 7, until achieving the actuation quantities of the legs;

step 9, measuring a current load of the each leg, and calculating a load deviation rate between the each current load with the each optimal load of the each leg; and measuring each two-dimensional inclination angle of the platform around the x and y axes;

step 10, comparing the load deviation rates of the legs and the two-dimensional inclination angles of the platform with the set load deviation rate threshold and inclination angle threshold respectively to determine if the leg locking condition is satisfied: on condition the load deviation rates of all the legs and all the two-dimensional inclination angles of the platform are smaller than or equal to the load deviation rate threshold and inclination angle threshold respectively, concluding the leveling control method; otherwise proceeding to step 11;

step 11, re-substituting the current loads of the legs and the two-dimensional inclination angles of the platform described in step 9 into the platform geometry and leg load joint control equation described in step 7, calculating the actuation quantities of the legs and executing steps 8 and 9 until the leg locking condition is satisfied, and concluding the leveling control method.

2. The leveling control method for a multi-point support platform of claim 1, wherein the set displacement described in step 1 is in a range of 1% to 5% of the maximum stroke.

* * * * *